US008005818B2

(12) United States Patent
Perry et al.

(10) Patent No.: US 8,005,818 B2
(45) Date of Patent: Aug. 23, 2011

(54) APPARATUS AND METHOD FOR MAINTAINING METADATA VERSION AWARENESS DURING SET EVALUATION FOR OLAP HIERARCHIES

(75) Inventors: Daniel Perry, New Westminster (CA); Jan Michael Timmerman, Vancouver (CA); Reuben Michael Arthur Cox, Vancouver (CA)

(73) Assignee: Business Objects, S.A., Levallois-Perret (FR)

( * ) Notice: Subject to any disclaimer, the term of this patent is extended or adjusted under 35 U.S.C. 154(b) by 388 days.

(21) Appl. No.: 12/059,999

(22) Filed: Mar. 31, 2008

(65) Prior Publication Data

US 2009/0248651 A1    Oct. 1, 2009

(51) Int. Cl.
*G06F 7/00* (2006.01)
(52) U.S. Cl. ......... 707/713; 707/759; 707/765; 707/786
(58) Field of Classification Search .................. 707/713
See application file for complete search history.

(56) References Cited

U.S. PATENT DOCUMENTS

| 5,428,776 | A * | 6/1995 | Rothfield | 1/1 |
| 6,493,718 | B1 * | 12/2002 | Petculescu et al. | 707/600 |
| 6,581,068 | B1 * | 6/2003 | Bensoussan et al. | 1/1 |
| 6,651,055 | B1 * | 11/2003 | Kilmer et al. | 1/1 |
| 6,678,672 | B1 * | 1/2004 | Ramasamy et al. | 1/1 |
| 6,763,357 | B1 * | 7/2004 | Deshpande et al. | 1/1 |
| 7,302,421 | B2 * | 11/2007 | Aldridge | 1/1 |
| 7,716,167 | B2 * | 5/2010 | Colossi et al. | 707/714 |
| 2003/0093424 | A1 * | 5/2003 | Chun et al. | 707/7 |
| 2004/0039736 | A1 * | 2/2004 | Kilmer et al. | 707/3 |
| 2004/0049505 | A1 * | 3/2004 | Pennock | 707/5 |
| 2005/0010550 | A1 * | 1/2005 | Potter et al. | 707/1 |
| 2005/0120018 | A1 * | 6/2005 | Whitney, IV | 707/5 |
| 2006/0294087 | A1 * | 12/2006 | Mordvinov | 707/4 |
| 2007/0067274 | A1 * | 3/2007 | Han et al. | 707/4 |
| 2007/0168323 | A1 * | 7/2007 | Dickerman et al. | 707/2 |
| 2007/0233644 | A1 * | 10/2007 | Bakalash et al. | 707/2 |
| 2007/0239673 | A1 * | 10/2007 | Barsness et al. | 707/3 |
| 2008/0177722 | A1 * | 7/2008 | Lohman et al. | 707/4 |
| 2008/0288306 | A1 * | 11/2008 | MacIntyre et al. | 705/7 |

OTHER PUBLICATIONS

EP Appln. No. 09003783.9. Business Objects, S.A. Invitation pursuant to Article 94(3) and Rule 71(1) EPC (Sep. 7, 2010.

\* cited by examiner

*Primary Examiner* — Don Wong
*Assistant Examiner* — Binh V Ho
(74) *Attorney, Agent, or Firm* — Mintz, Levin, Cohn, Ferris, Glovsky and Popeo, P.C.

(57) ABSTRACT

A computer readable storage medium comprises executable instructions to receive a query referencing a set of members of an OLAP hierarchy. The query is parsed into a syntax tree. Changes to the OLAP hierarchy metadata are received. The syntax tree is refined in response to the changes. The query is evaluated to return results that are independent of the changes to the OLAP hierarchy metadata.

23 Claims, 12 Drawing Sheets

OLAP Hierarchy

S1.removeMember(1.1)

S2 = {}
S2.addAncestors(R,1)
S2.addDescendants(R,1)

S.subset(2, C1)

APPARATUS AND METHOD FOR MAINTAINING METADATA VERSION AWARENESS DURING SET EVALUATION FOR OLAP HIERARCHIES

FIELD OF THE INVENTION

This invention relates generally to the evaluation of queries of multidimensional data sources. More particularly, this invention relates to techniques for enabling users to query a set of members of an OLAP hierarchy using dynamic queries that are evaluated to return results expected of static queries.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, such as relational, Online Transaction Processing ("OLTP") and Online Analytic Processing ("OLAP") databases, and performance management applications to provide business metrics, dashboards, and scorecards, as well as best-practice analysis techniques for gaining business insights.

OLAP data sources and tools are a subset of BI tools. There are a number of commercially available OLAP tools, such as, for example, Business Objects Voyager™, available from Business Objects™, an SAP® company, of San Jose, Calif. OLAP tools are report generation tools and are otherwise suited to ad hoc analyses. OLAP generally refers to a technique of providing fast analysis of shared multidimensional information stored in a database. OLAP systems provide a multidimensional conceptual view of data, including full support for hierarchies and multiple hierarchies. This framework is used because it is a logical way to analyze businesses and organizations. In some OLAP tools, the data is arranged and interrelated to simulate a multidimensional schema. The multidimensional schema means redundant information is stored. The redundancy comes from storing many different aggregations of the data. This allows users to initiate many different queries without a need to know how the data is organized.

OLAP tools are typically implemented in a multi-user client/server mode to offer consistently rapid responses to queries, regardless of database size and complexity. OLAP helps the user synthesize information through the use of an OLAP server that is specifically designed to support and operate on multidimensional data sources. The design of the OLAP server and the structure of the data are optimized for rapid ad hoc information retrieval in any orientation, as well as for fast, flexible calculation and transformation of raw data members on formulaic relationships.

The querying process for OLAP data sources can involve, depending on the specific implementation, Citing and executing a query. Multidimensional Expressions ("MDX") is a query language for OLAP databases, like SQL, is a query language for relational databases. Thus, an MDX statement can be used to query for a result from an OLAP data source, i.e., an OLAP data cube. The MDX statements may resemble SQL statements that are used to query for data arranged on rows and columns of a data cube. As with an SQL entry, each MDX query requires a data request (the "SELECT" clause), a starting point (the "FROM" clause), and a filter (the "WHERE" clause). These and other keywords provide the tools used to extract specific portions of data from a cube for analysis, e.g., to extract a slice of the cube.

In one application, MDX queries can be used to specify the addition of a calculation, i.e., a value, to a hierarchy of multidimensional data. There are two ways to achieve this: by using user scoped and query scoped commands. A calculation created with user scope commands persists until the user logs out. A calculation created with query scope commands persists until the end of the queries' evaluation. In MDX, an exemplary user scoped command is the "CREATE MEMBER" command:

CREATE MEMBER
  [CubeName].[hierarchyName].[ParentName].[MemberName] AS MDX_Expression . . .

In MDX an exemplary query scoped command is executed with the "WITH" clause:

WITH MEMBER
  [CubeName].[hierarchyName].[ParentName].[MemberName] AS MDX_Expression . . .

The MDX_Expression determines the value of the calculation. The calculation need not be a dynamic value and a can be a static value.

MDX expressions may also be used to remove a calculation from an OLAP hierarchy. Both the addition and removal of a calculation to/from an OLAP hierarchy results in changes to the hierarchy's metadata. OLAP hierarchy metadata describes the data objects in the OLAP hierarchy and the relationships between the data objects. The OLAP data objects can be grouped by their relationships to each other into a metadata object called an OLAP cube.

In another application, MDX queries can be used to create and query a set of members of an OLAP hierarchy. For example, an OLAP hierarchy may include a root member with three children members. A set may be defined to include some or all of the members of the OLAP hierarchy, e.g., a set can be defined to include the root's children.

There are mainly two ways for defining a set of members of an OLAP hierarchy. The first uses dynamic queries, i.e., queries that are evaluated at query execution time, while the second uses static queries, i.e., queries that are evaluated at the time the set is created with the results cached for later retrieval when the query is executed. Dynamic queries are generally preferred, as they offer greater degrees of optimization than static queries.

Static queries diminish the efficiency of OLAP tools because each time a set is created, the query defining the set is evaluated and its results are cached. If the set definition is composed of multiple sets, each constituent set is cached. Static queries thereby incur more data storage and OLAP access requests and cannot be optimized like dynamic queries.

However, static queries are more intuitive to users. This is so because changes to an OLAP hierarchy metadata, e.g., calculation changes that add or delete a calculation from an OLAP hierarchy, performed after a static query defining a set do not affect the results of the static query. The results of a static query are only affected by changes applied to the set since the last set evaluation, and not by changes applied to the OLAP hierarchy metadata. This is not the case with dynamic queries, which are evaluated entirely at evaluation time, also referred to as query evaluation time. Changes to an OLAP hierarchy metadata performed after a dynamic query defining a set are reflected in the results of the dynamic query.

Figures 1A, 1B:
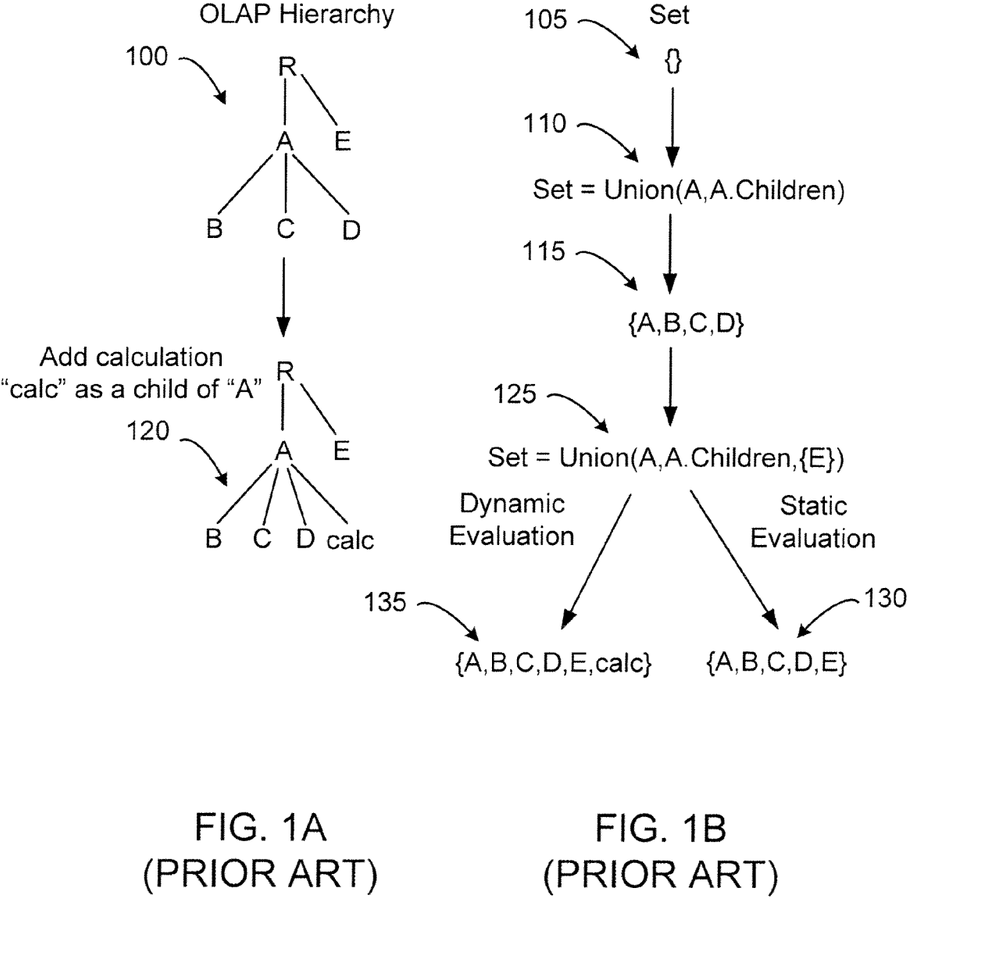
FIG. 1A illustrates a prior art process flow for adding a calculation to an OLAP hierarchy.
FIG. 1B illustrates a prior art process flow for defining and evaluating a set of members of the OLAP hierarchy shown in FIG. 1A.

For example, consider the OLAP hierarchy and the set of members illustrated in FIGS. 1A and 1B. OLAP hierarchy 100 is shown in FIG. 1A with a root node "R", two children "A" and "E" and three children "B", "C", and "D". A user creates a set 105, as shown in FIG. 1B, and defines it with an expression 110 to be the union of node "A" and its children. Evaluating the set against OLAP hierarchy 100 results in a set 115 containing the members {A, B, C, D}.

Now suppose the user adds a calculation "calc" to the OLAP hierarchy, with the calculation "calc" being a child of "A" resulting in OLAP hierarchy 120. Suppose further that after the OLAP hierarchy 100 and its metadata are modified to OLAP hierarchy 120, the user performs a query 125 modifying the set as the union of node "A", its children, and a new member {E}.

As described above, the results of this query depend on whether the query is evaluated as a static query or as a dynamic query. If query 125 is evaluated as a static query, then its results are only affected by changes applied to the set since the last set evaluation. The last set evaluation returned set 115 containing members {A, B, C, D}. Because the children of node "A" at the time evaluated to "B", "C", and "D", adding a new member "E" to the set results in a set 130 containing members {A, B, C, D, E}. That is, adding the calculation "calc" to OLAP hierarchy 100 does not affect the results of query 125 when evaluating it statically.

This is not the case if query 125 is evaluated dynamically. In this case, the union of "A", "A.children", and new member {E} is executed at the time query 125 is evaluated. Because the calculation "calc" is a child of "A" when query 125 is evaluated, A.children evaluates to {B, C, D, E, calc}. The query results therefore return a set 135 containing members {A, B, C, D, E, calc}. That is, adding the calculation "calc" to OLAP hierarchy 100 affects the results of query 125 when evaluating it dynamically.

Accordingly, since dynamic queries may be optimized and static queries return results that are consistent with a user's definition of a set, it would be desirable to provide techniques to enable users to use dynamic queries to evaluate sets while maintaining the behavior of static queries.

SUMMARY OF THE INVENTION

The invention includes a computer readable storage medium with executable instructions to receive a query referencing a set of members of an OLAP hierarchy. The query is parsed into a syntax tree. Changes to the OLAP hierarchy metadata are received. The syntax tree is refined in response to the changes and the query is evaluated to return results that are independent of the changes.

The invention also includes a method for evaluating a query. A query is received referencing a set of members of an OLAP hierarchy. The OLAP hierarchy is modified to accommodate calculation changes to the OLAP hierarchy. The calculation changes are excluded from the query. The query is evaluated to return results that are independent of the calculation changes.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

The present invention provides a system, method, software arrangement, and computer readable storage medium for evaluating dynamic queries referencing a set of members of an OLAP data source that return results expected of static queries. An OLAP data source, as generally used herein, refers to any multidimensional data source providing a multidimensional conceptual view of data, including full support for hierarchies and multiple hierarchies. An OLAP hierarchy may contain a plurality of members, including non-calculated members and calculations, organized in hierarchical order. The hierarchical order, as generally used herein, specifies the order in which members are visited in a depth first traversal of the hierarchy where parents are ordered before their children. In one embodiment, only the non-calculated members of the hierarchy may have children.

The members of an OLAP hierarchy may be organized into one or more sets, where a set generally refers to a set of members as specified by a user. According to an embodiment of the invention, a user may create data sets of an OLAP hierarchy using dynamic queries that are evaluated as static queries, i.e., dynamic queries that return results that are independent of changes to the OLAP hierarchy metadata. Dynamic queries, as generally used herein, refer to queries that are evaluated at query execution time, while static queries refer to queries that are evaluated at set definition time.

In one embodiment, users define sets of members of an OLAP hierarchy using dynamic queries that consist of set functions that are joined together with set operations. Set functions may include, for example, Ancestors, Descendants, EnumeratedSet, Count, Rank, Subset, and Filter, among others. Set operations may include, for example, Union, Intersect, and Except. For example, for OLAP hierarchy 100 shown in FIG. 1A, a set of members containing the root's children may be defined as "Union(A, A.children)", "Union (A, Descendants(A))", or "Union(A.children, Ancestors(A.children))", among others.

The dynamic queries are evaluated as static queries to return results that are independent of changes to the OLAP hierarchy metadata, such as, for example, calculation changes to the OLAP hierarchy. These calculation changes may include the addition or deletion of calculations to, from the OLAP hierarchy.

According to an embodiment of the invention, dynamic queries defining a set are parsed into a syntax tree having nodes that include the set functions, set operations, and set members that are used to define the set. When the OLAP hierarchy metadata is modified by the user, by, say, adding or deleting a calculation to/from the OLAP hierarchy, the syntax tree is refined to remove references to the calculation. As described in more detail herein below, this is accomplished by removing references to the calculation from the set and the set operations affected by the calculation.

Figure 2:
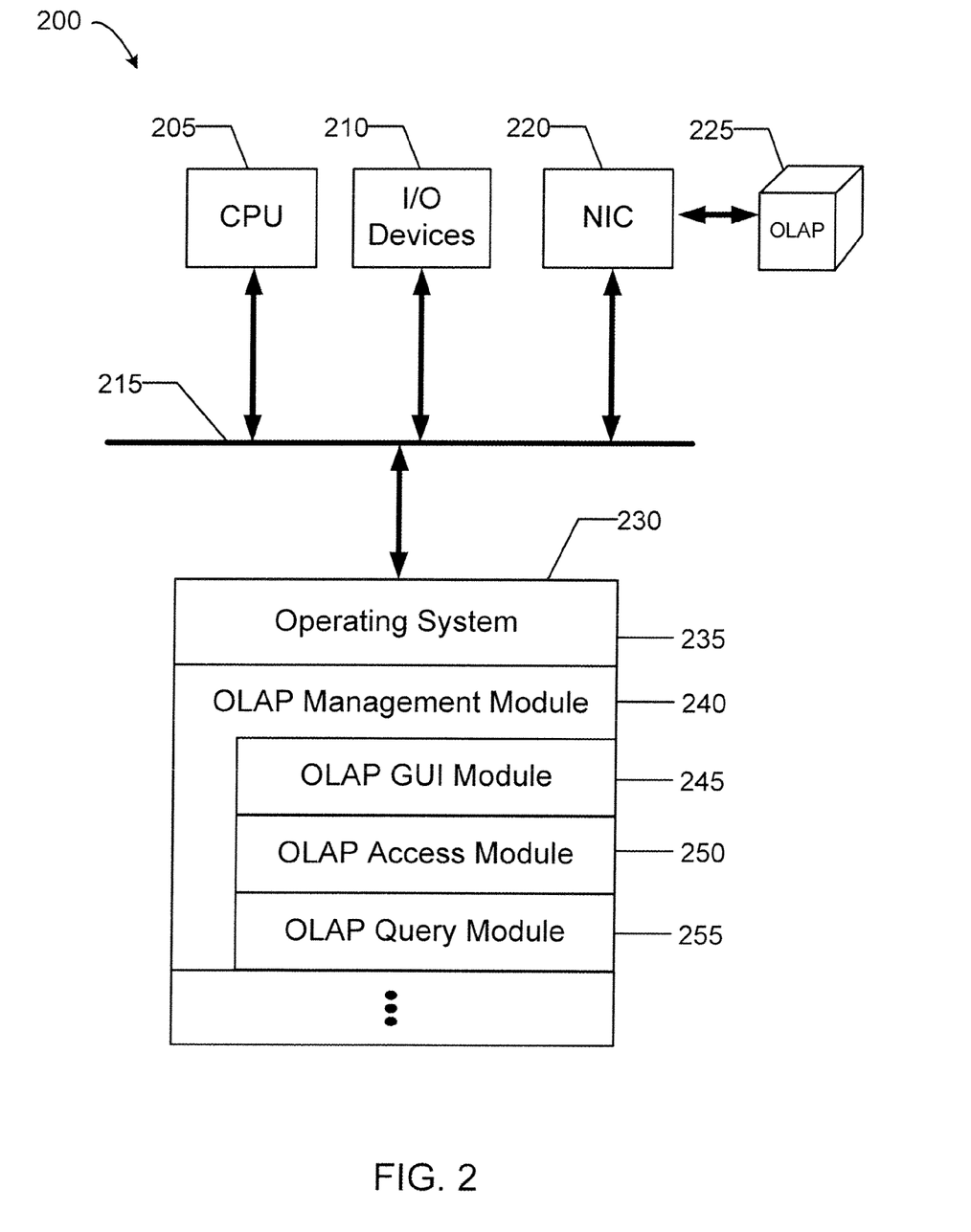
FIG. 2 illustrates a computer constructed in accordance with an embodiment of the invention.

FIG. 2 illustrates a network appliance configured in accordance with an embodiment of the invention. Computer 200 includes standard components, including a Central Processing Unit ("CPU") 205 and input/output devices 210, which are linked by a bus 215. Input/output devices 210 may include a keyboard, mouse, display screen, monitor, printer, and the like.

Network Interface Circuit ("NIC") 220 may also be connected to the bus 215. NIC 220 provides connectivity to a wired or a wireless network (not shown), thereby allowing computer 200 to operate in a networked environment. For example, networked data sources 225 are connected to computer 200 through NIC 220. In accordance with an embodiment of the invention, networked data sources 225 may include an OLAP data source in an OLAP server.

Memory 230 is also connected to the bus 215. In one exemplary embodiment, memory 230 stores one or more of the following modules: an Operating System module 235 and an OLAP Management module 240. Operating System module 235 may include instructions for handling various system services, such as file services or for performing hardware dependant tasks. The OLAP Management module 240 may include executable instructions for performing OLAP related tasks, including supporting a graphical user interface ("GUI") and interfacing with an OLAP data source.

According to an embodiment of the invention, OLAP Management module 240 includes an OLAP GUI module 245, an OLAP Access module 250, and an OLAP Query module 255. The OLAP GUI module 245 may rely upon standard techniques to produce graphical components of a user interface, e.g., windows, icons, buttons, menu and the like, for accessing and managing OLAP data source 225. For example, a user may employ the GUI to define and review the results of a query. In one embodiment, the user may also employ the GUI to create and evaluate sets of members of OLAP hierarchies in OLAP data source 225.

OLAP Access module 250 may include executable instructions to allow computer 200 to access any OLAP data source, e.g., OLAP data source 225. For example, OLAP Access module 250 may include executable instructions to create, access, and modify an OLAP hierarchy and its metadata, including executable instructions to add and remove non-calculated members and calculations to/from the OLAP hierarchy. OLAP Access module 250 may also include executable instructions to evaluate and manage the calculations in the OLAP hierarchy. OLAP Access module 250 may rely on OLAP Query module 255 to implement part of its operations.

OLAP Query module 255 may include executable instructions that help define, evaluate, and optimize queries to an OLAP hierarchy, including queries that define and reference a set of members of the OLAP hierarchy. OLAP Query module 255 may also include executable instructions to, in accordance with an embodiment of the invention, evaluate dynamic queries referencing sets of members of the OLAP hierarchy to return results expected of static queries, i.e., to return results that are independent of changes to the OLAP hierarchy metadata.

It is appreciated that the executable modules stored in memory 230 are exemplary. It is also appreciated that the functions of the modules may be combined. In addition, the functions of the modules need not be performed on a single computer. Instead, the functions may be distributed across a network, if desired.

Indeed, the invention may be commonly implemented in a client-server environment with various components being implemented at the client-side and/or the server-side. For example, one of ordinary skill in the art appreciates that the functions of modules 240-255 may be performed at computer 200 or at a server connected to computer 100. In one exemplary embodiment, some or all of the functions of modules 240-255 may be performed at computer 200. In another exemplary embodiment, some or all of the functions of modules 240-255 may be performed at a server connected to computer 200. As understood by those of ordinary skill in the art, it is the functions of the invention that are significant, not where they are performed or the specific manner in which they are performed.

Figure 3:
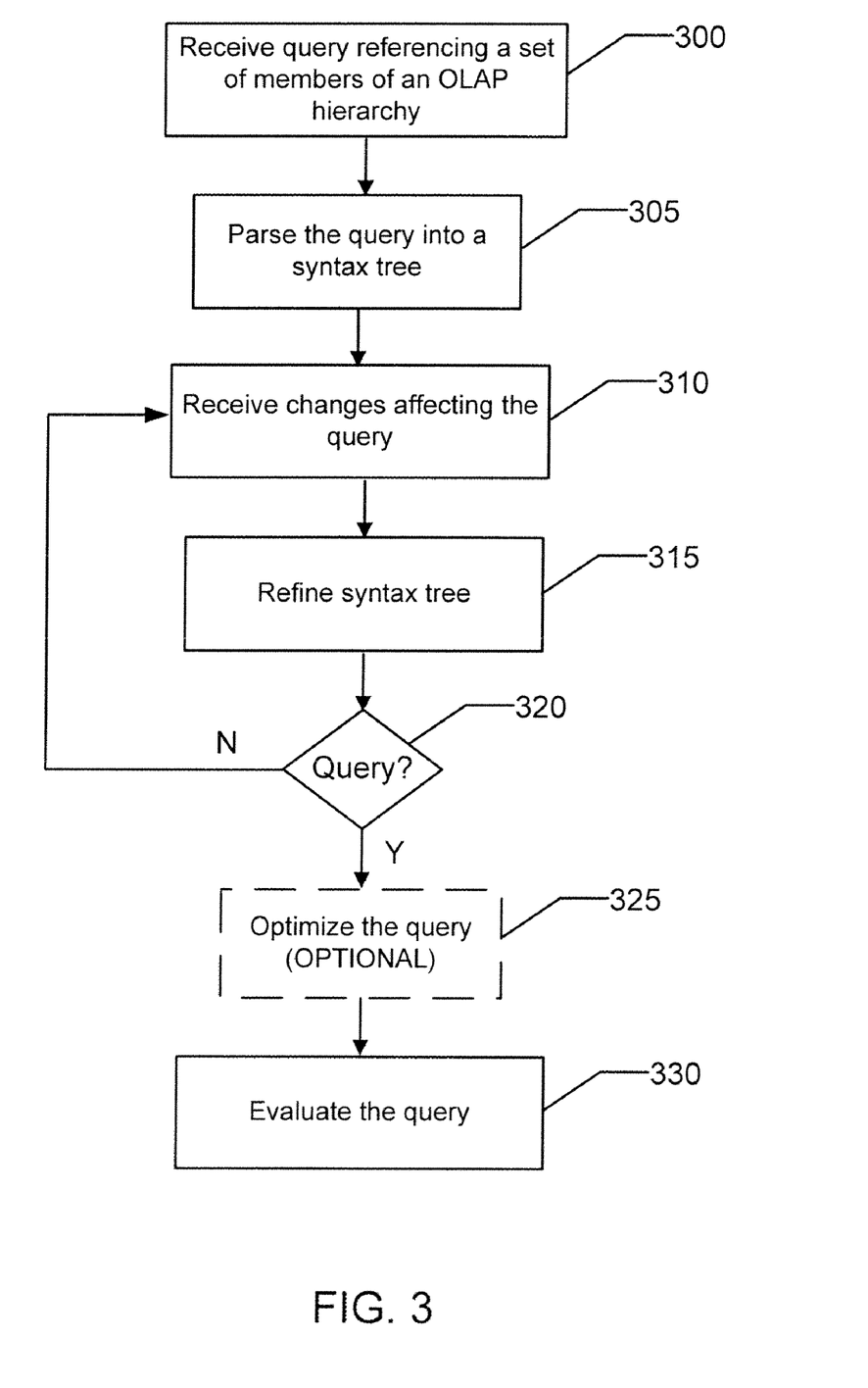
FIG. 3 illustrates a flow chart for evaluating dynamic queries to return results expected of static queries in accordance with an embodiment of the invention.

Referring now to FIG. 3, a flow chart for evaluating dynamic queries to return results expected of static queries is described. First, a dynamic query referencing a set of members of an OLAP hierarchy is received (300). Such a dynamic query may be received, for example, from a user defining and referencing a set with OLAP GUI module 245. According to an embodiment of the invention, users define and reference sets of members of an OLAP hierarchy using dynamic queries that consist of set functions that are joined together with set operations. Set functions may include, for example, Ancestors, Descendants, EnumeratedSet, Count, Rank, Subset, and Filter, among others. Set operations may include, for example, Union, Intersect, and Except.

Next, the dynamic query is parsed into a syntax tree (305). The syntax tree, as described in more detail herein below, may include the set functions, set operations, and set members that are used to define the set. For example, query 10 shown in FIG. 1B may be parsed into a syntax tree containing the Union operation as its root and the "A" and "A.children" members as its children.

The user (or the OLAP server) may make changes affecting the query (310). Such changes may include, for example, changes to the OLAP hierarchy metadata or changes to the defined set. Changes to the OLAP hierarchy metadata may include the addition or deletion of a calculation to/from the OLAP hierarchy.

The syntax tree is refined in response to the received changes (315). As described in more detail herein below, for calculation changes to the OLAP hierarchy, this is accomplished by removing references to the calculation from the set and the set operations affected by the calculation changes.

OLAP Query module 255 checks if the user is ready to query the set against the OLAP hierarchy (320). If not, then additional changes affecting the query may be received (310) and the syntax tree may be further refined in response to the additional changes (315). When the query is ready to be launched against the OLAP hierarchy, the user (or the OLAP server) may elect to optimize the query prior to evaluating it (325).

Lastly, the query is evaluated to return results that are independent of changes to the OLAP hierarchy metadata (330). That is, the syntax tree is traversed and the set functions and operations in the tree are executed to return the query results. As described in more detail herein below, the results returned are results expected of static queries referencing the set.

It is appreciated that the user may define and evaluate multiple sets of members of the OLAP hierarchy. It is further appreciated that sets defined after changes to the OLAP hierarchy metadata are performed include members that reflect those changes.

Figure 4A:
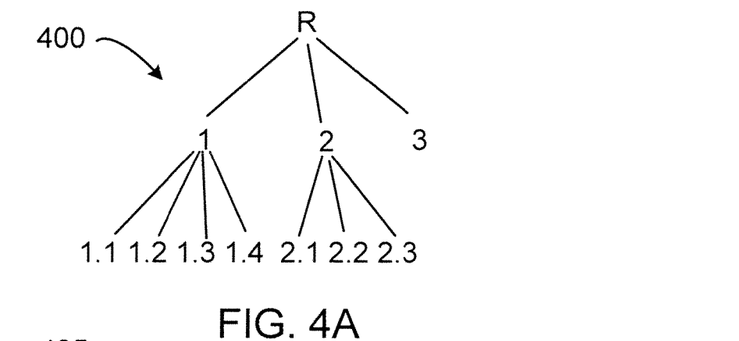
FIG. 4A illustrates an exemplary OLAP hierarchy in accordance with an embodiment of the invention.

An exemplary CLAP hierarchy is illustrated in FIG. 4A. CLAP hierarchy 400 includes a root member "R" having three children "1", "2" and "3". Children "1" and "2" have four and three children, respectively, denoted by "1.1", "1.2", "1.3" and "1.4" and "2.1", "2.2" and "2.3".

Figure 4B:
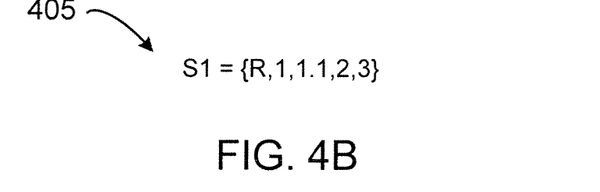
FIG. 4B illustrates a set of members of the exemplary OLAP hierarchy of FIG. 4A in accordance with an embodiment of the invention.

An example of a set of members of OLAP hierarchy 400 is illustrated in FIG. 4B. Set S1 405 includes the members {R, 1, 1.1, 2, 3} from OLAP hierarchy 400. According to an embodiment of the invention, set 405 may be defined for example, by using a dynamic query based on the Union operation, such as a query of the form "Union(Union(Union (Union(R, 1), 1.1), 2), 3)".

Figure 4C:
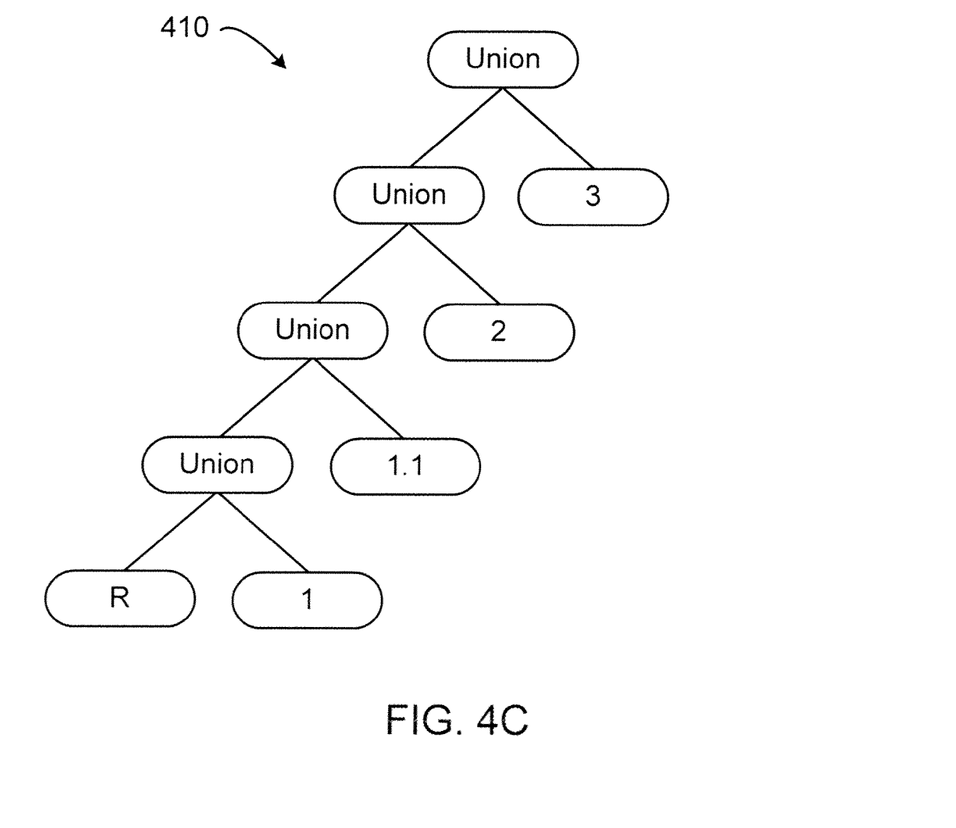
FIG. 4C illustrates an exemplary syntax tree representing the set of FIG. 4B in accordance with an embodiment of the invention.

An exemplary syntax tree representing set 405 in accordance with an embodiment of the invention is illustrated in FIG. 4C. Syntax tree 410 contains nodes that include the Union operation and its member arguments. As appreciated by one of ordinary skill in the art, the syntax tree may be traversed to reconstruct the query.

When parsing a query referencing a set into a syntax tree (305), OLAP Query module 255 verifies whether there are set functions in the syntax tree that may be affected by changes to calculations in the OLAP hierarchy. This is so because set functions that are affected by calculation changes may break, i.e., return an error or incorrect results, when a calculation is added to or deleted from the OLAP hierarchy.

For example, consider OLAP hierarchy 120 shown in FIG. 1A. Now suppose that a set S is defined as:

$$S=\text{Union}(\text{Except}(A.\text{children},\{B,C,D\}),\text{Ancestors}(\text{Except}(A.\text{children}\{B,C,D\}1))) \quad (1)$$

The first argument of the Union operation returns {calc} and the second argument returns the first generation ancestors of {calc}, i.e., {A}. Now suppose that the calculation "calc" is deleted from OLAP hierarchy 120. If the query is evaluated, the correct static result should be {A}. This is because the first argument of the Union operation is now an empty set with the removal of "calc", while the second argument should still evaluate to {A}, from the OLAP hierarchy. However, when the Ancestors function is executed to return the first generation ancestors of the OLAP hierarchy member "calc", since "calc" is no longer a member of the OLAP hierarchy, the function returns an empty set.

That is, set functions that are sensitive to the presence of its argument, e.g., a calculation, in the OLAP hierarchy do not return the expected results when the argument is removed from the OLAP hierarchy. To ensure that those set functions are still capable of returning their expected results, OLAP Query module 255 modifies those functions in the syntax tree to explicitly reference any calculations present in the OLAP hierarchy. In doing so, the explicit references to the calculations may be easily removed when the calculations are removed from the OLAP hierarchy, thereby ensuring that those functions behave as expected.

Figure 5:
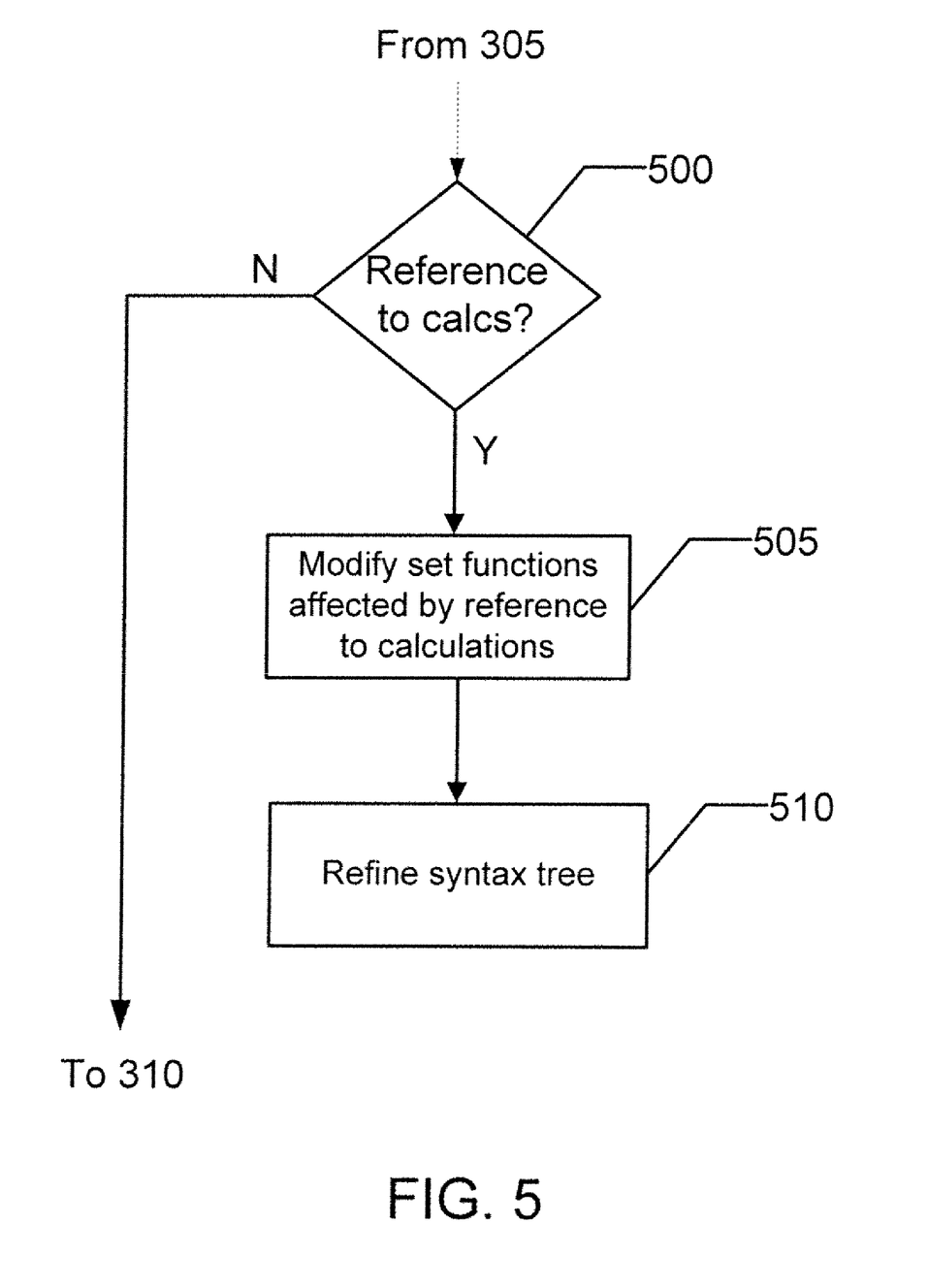
FIG. 5 illustrates a flow chart for parsing a syntax tree to modify set functions affected by calculation changes to an OLAP hierarchy in accordance with an embodiment of the invention.

Referring now to FIG. 5, a flow chart for parsing a syntax tree to modify set functions affected by calculation changes to an OLAP hierarchy in accordance with an embodiment of the invention is described. First, OLAP Query module 255 immediately checks the syntax tree to determine whether there are any set functions that are affected by the presence of calculations in the OLAP hierarchy (500). These functions include the Ancestors (as exemplified above) and the Subset function. If those functions are not present in the syntax tree, then OLAP Query module 255 proceeds to receive changes to the OLAP hierarchy metadata (310) as described above.

Otherwise, if either the Ancestors or the Subset functions are present in the syntax tree, then those functions are modified to explicitly reference calculations (505). In the case of the Ancestors function, a function call of Ancestors(set) is modified as:

$$\text{Union}(\text{Ancestors}(\text{set}),\text{calcAncestors}(\text{calcsInSet})) \quad (2)$$

$$\text{calcsInSet}=\text{runQuery}(\text{Intersect}(\text{set},\text{knownCalcs})) \quad (3)$$

and "calcAncestors(calcsInSet)" is a function that loops over the enumerated set, pulls out each calculation, and executes the Ancestors function (with modified arguments) on the calculation's parent.

That is, substituting any Ancestors(set) function call in the syntax tree for the function call in (2) above results in the Ancestors of a calculation being returned off the calculation's parent. In doing so, if the calculation is to be removed from the OLAP hierarchy, the Ancestors function properly executes off the calculation's parent, which is still a member of the OLAP hierarchy.

Similarly, in the case of the Subset function, a function call of Subset(m1, m2) is modified as:

$$\text{If(m1 is a calculation) return Union}(\text{EnumeratedSet}(m1),\text{Subset}(m1+1,m2)) \quad (4)$$

$$\text{If(m2 is a calculation) return Union}(\text{Subset}(m1,m2-1),\text{EnumeratedSet}(m2)) \quad (5)$$

Substituting any Subset(m1, m2) function call in the syntax tree for the function call in (4) or (5) results in the Subset function properly returning results for the desired subset when the referenced calculation is removed from the OLAP hierarchy. It is appreciated that the notation "m1+1" denotes the member after "m1". Likewise, "m2−1" denotes the member before "m2".

Lastly, the syntax tree is refined to substitute any Ancestors and/or Subset function found in the tree for their corresponding modifications (510). As described in more detail herein below, doing so enables the removal of a calculation to be easily performed by simply removing explicit references to the calculation from the syntax tree.

Figure 6:
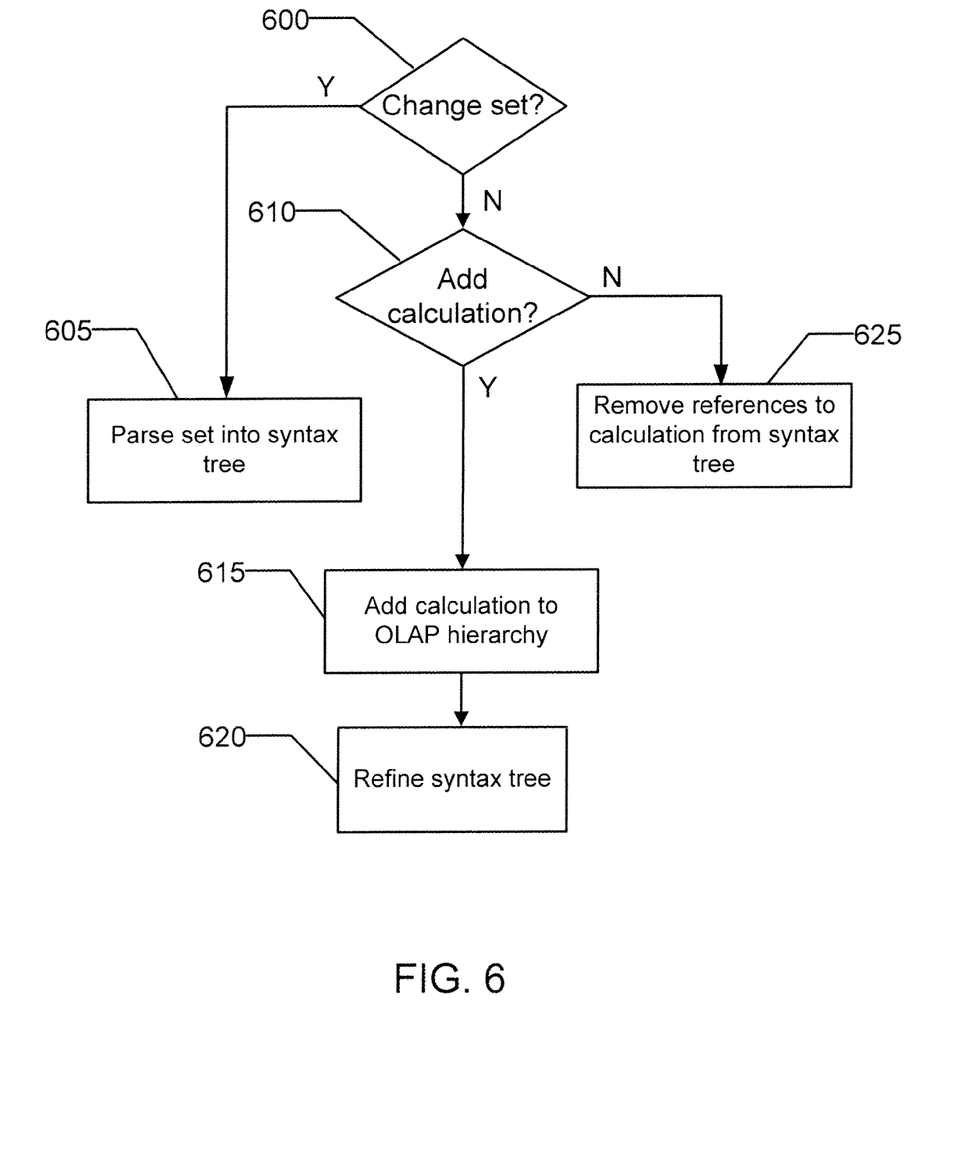
FIG. 6 illustrates a flow chart for receiving changes affecting a query in accordance with an embodiment of the invention.

Referring now to FIG. 6, a flow chart for receiving changes affecting a query in accordance with an embodiment of the invention is described. OLAP Query module 255 checks the changes affecting the query to determine whether they are changes to the defined set (600). If so, then the redefined set is parsed into the syntax tree (605). In one embodiment, the current syntax tree is discarded and a new one is created by parsing the refined set. If not, then the changes affecting the query include changes to the OLAP hierarchy metadata, for example, calculation changes to the OLAP hierarchy.

OLAP Query module 255 then determines whether the changes include the addition of a calculation to the OLAP hierarchy (610). If so, the calculation is added to the OLAP hierarchy (615) and the syntax tree is refined so that the query evaluation returns results that are independent of the added calculation (620). Otherwise, if instead a calculation is to be deleted from the OLAP hierarchy, then OLAP query module 255 proceeds to remove the references to the calculation from the syntax tree (625).

Figure 7A:
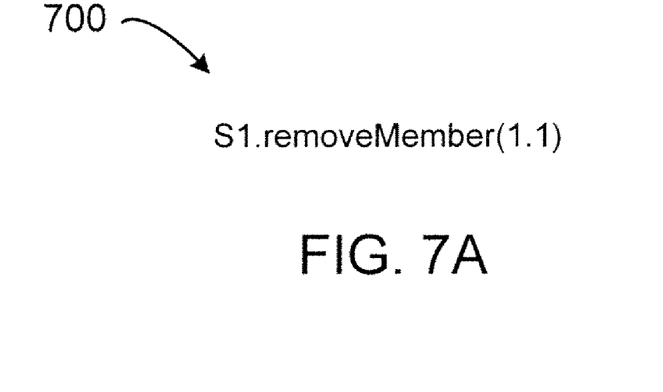
FIG. 7A illustrates an exemplary change performed on a set in accordance with an embodiment of the invention.
Figure 7B:
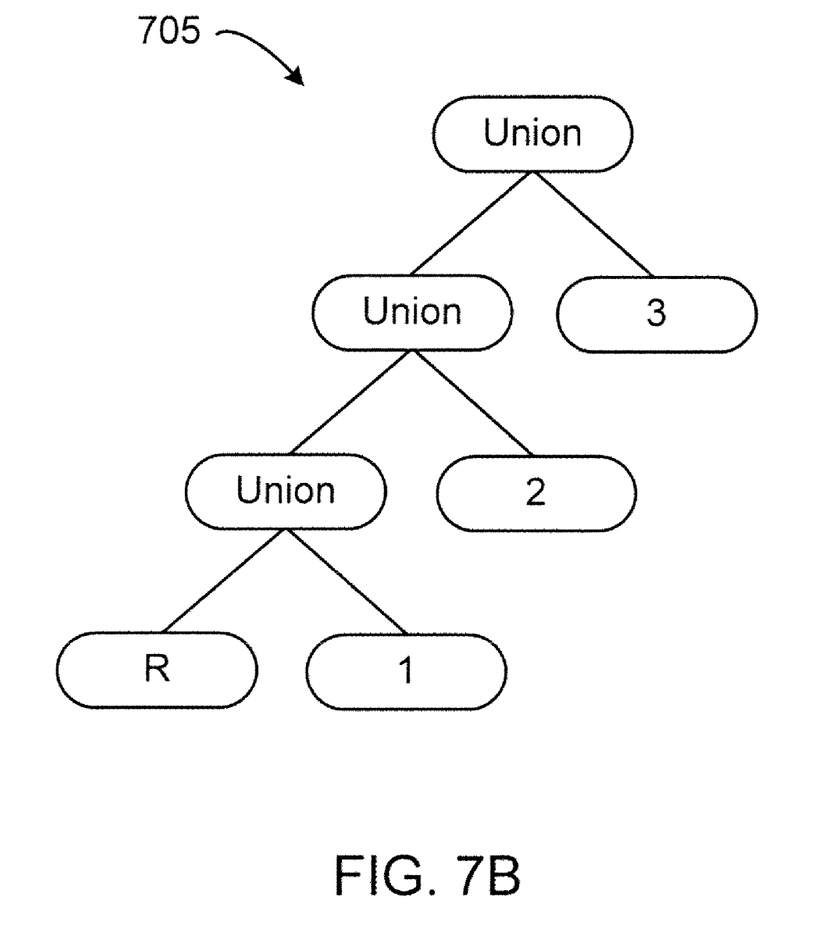
FIG. 7B illustrates an exemplary syntax tree resulting from the change performed in FIG. 7A in accordance with an embodiment of the invention.

FIGS. 7A and 7B respectively illustrate an exemplary change performed on a set and the resulting syntax tree in accordance with an embodiment of the invention. A user may, for example, remove a member from the set S1 405 shown in FIG. 4 to result in a set 700 that consists of members {R, 1, 2, 3}. When OLAP Query module 255 receives a change to a set, the redefined set is parsed into the syntax tree, i.e., the syntax tree is refined to incorporate the changes to the set (605). After query optimization, the resulting syntax tree 705 is shown in FIG. 7B.

Figure 8A:
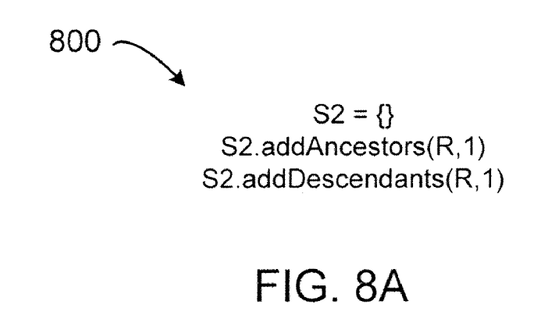
FIG. 8A illustrates an exemplary new set based on an existing set in accordance with an embodiment of the invention.
Figure 8B:
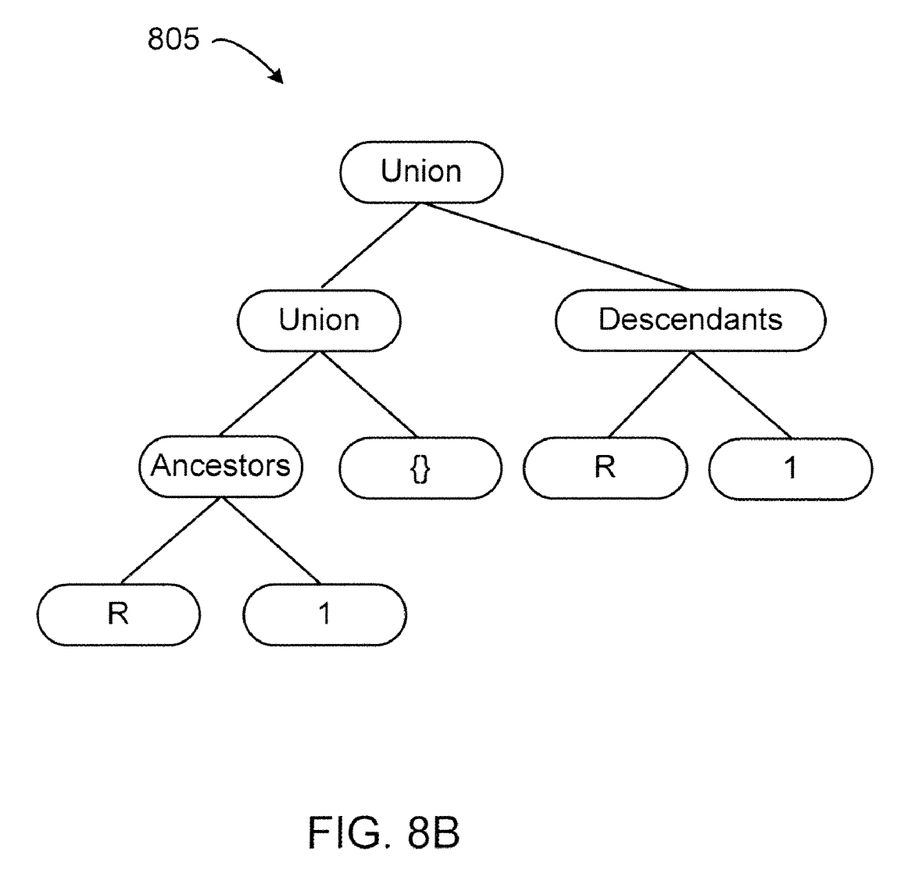
FIG. 8B illustrates an exemplary syntax tree resulting from the new set defined in FIG. 8A in accordance with an embodiment of the invention.

The user may also define new sets that are based on an existing set. FIGS. 8A and 8B respectively illustrate an exemplary new set definition and the resulting syntax tree in accordance with an embodiment of the invention. Set S2 800 is defined by taking the Ancestors at the first level, i.e., the Ancestors of the children of root node "R" or "R" itself, and adding the Descendants at the first level, i.e., the children of "R". S2 is therefore a set including the members {R, 1, 2, 3}. The resulting syntax tree 805 is shown in FIG. 8B.

It is appreciated that sets S1 and S2 contain the same members but are represented with different syntax trees. The syntax trees are represented according to the set functions and set operations used to define the sets. Syntax tree 705 shown in FIG. 7B only lists the Union operation while syntax tree 805 lists the Union operation as well as the Ancestors and Descendants functions. It is appreciated that regardless of how the syntax tree is represented, changes to the OLAP hierarchy metadata require the syntax tree to be refined to return query results that are independent of the changes.

Figure 9:
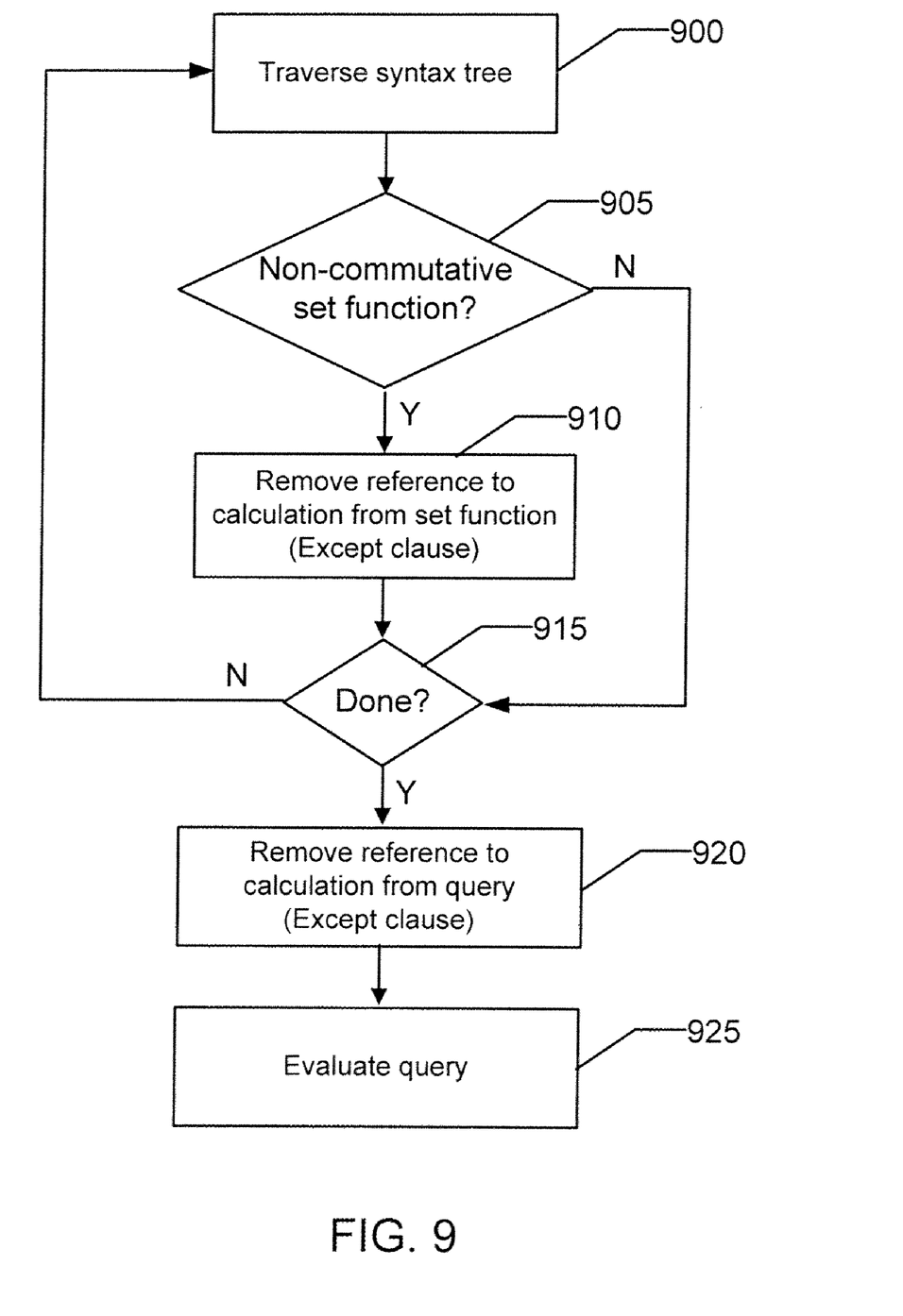
FIG. 9 illustrates a flow chart for refining a syntax tree in response to a calculation addition to an OLAP hierarchy in accordance with an embodiment of the invention.

Referring now to FIG. 9, a flow chart for refining a syntax tree in response to a calculation addition to an OLAP hierarchy in accordance with an embodiment of the invention is described. First, the syntax tree is traversed (900) to identify the set operations and functions present in the tree. OLAP Query module 255 refines the syntax tree according to the set operations and functions encountered.

As described above, the tree is refined so that the query is evaluated to return results that are independent of the added calculation. To do so, any references to the calculation need to be removed from the syntax tree. This is accomplished by applying the Except operation to remove the calculation from the query results. For the Union and Intersect operations, and the EnumeratedSet and Sort set functions, this can be accomplished by simply applying the Except operation around them, such as, for example, by executing Except(Union(S1, S2), calc).

For other set functions, however, removing the calculation from the query results requires that the Except operation be applied around them and recursively on the set that is passed into them. These set functions are referred to herein as non-commutative set functions and include the Ancestors, Descendants, Count, Rank, Filter and Subset functions. It is appreciated that the Descendants function is a special case of a non-commutative function. The function's non-commutative nature is only apparent when a hierarchy includes calculations descended from calculations. While in practice this is not done; it is not strictly forbidden.

Therefore, after the syntax tree is traversed to identify the set functions and the set operations that are present in the tree (900), OLAP Query module 255 determines whether there are any non-commutative set functions present in the tree (905). If not, then the tree can be refined by simply applying the Except operation around the entire tree (920). Otherwise, if there are non-commutative set functions present in the tree, then the Except operation is applied recursively to each set function (910) before applying it around the entire tree (920).

For example, for a non-commutative set function NCF (set), this first involves applying the Except operation around the set passed into the function. That is, the NCF(set) function call in the syntax tree is replaced for a NCF(Except(set, calc)) call. The Except operation is then further applied to the entire tree.

Lastly, when the entire tree has been traversed (915) and the Except operation applied to the entire tree (920), the query is evaluated (925). That is, the tree is traversed and each node in the tree containing a set operation or set function is executed to return results that are independent of the added calculation.

Figure 10A:
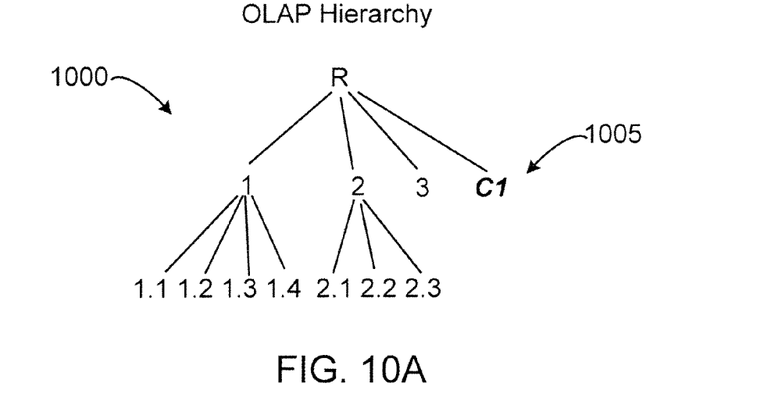
FIG. 10A illustrates an exemplary OLAP hierarchy with an added calculation in accordance with an embodiment of the invention.
Figure 10B:
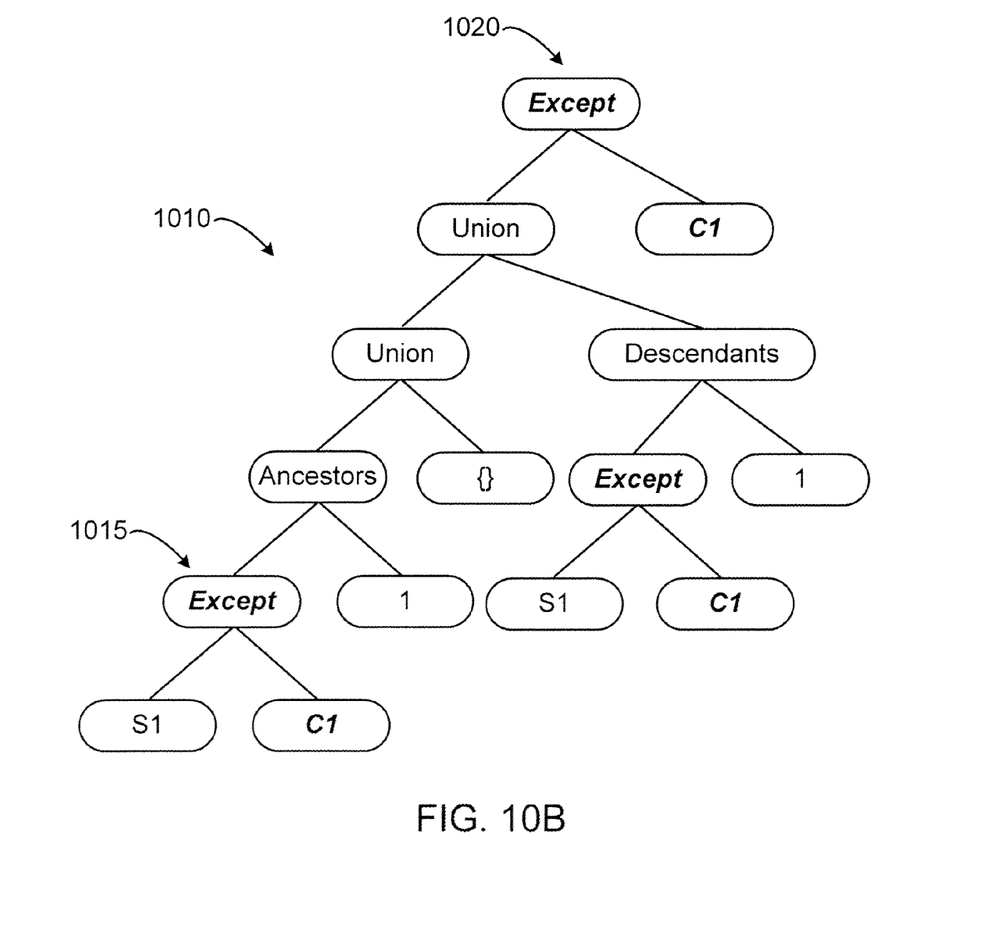
FIG. 10B illustrates the refined syntax tree of FIG. 8B in accordance with an embodiment of the invention.

FIG. 10A illustrates an exemplary OLAP hierarchy with an added calculation and FIG. 10B illustrates the refined syntax tree of FIG. 8B in accordance with an embodiment of the invention. OLAP hierarchy 1000 has added calculation "C1" 1005 as a child of "R". Adding C1 to the OLAP hierarchy requires syntax trees of queries into the OLAP hierarchy to be refined so that references to the calculation are removed from the query. As described above with reference to FIG. 9, this involves applying the Except operation to the entire tree as well as to non-commutative set functions found in the tree.

Refined syntax tree 1010 illustrates the application of the Except operation to remove references to the added calculation C1 from syntax tree 805. As shown, the Except operation 1015 is applied to the Ancestors function found in the tree and the Except operation 1020 is applied to the entire tree. Evaluating the query is now simply a matter of traversing the tree and executing the functions and operations found in the tree. Doing so ensures that the query results are independent of the added calculation.

Figure 11:
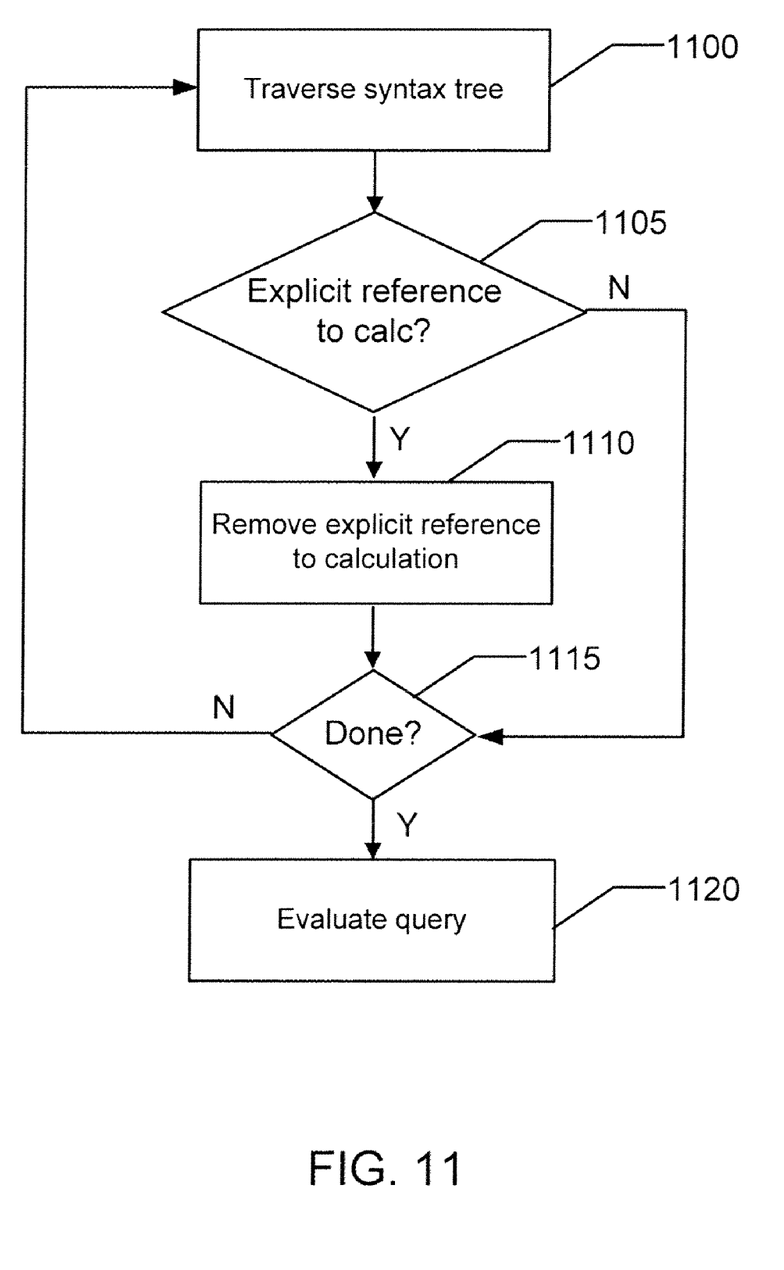
FIG. 11 illustrates a flow chart for refining a syntax tree in response to a calculation removal from an OLAP hierarchy in accordance with an embodiment of the invention.

Referring now to FIG. 11, a flow chart for refining a syntax tree in response to a calculation removal from an OLAP hierarchy in accordance with an embodiment of the invention is described. First, the syntax tree is traversed to identify the set functions and operations present in the tree (1100). OLAP Query module 255 then determines whether there are any set functions and operations that contain explicit references to calculations (1105).

If not, then the set functions and operations present in the tree are not affected by the calculation removal and the query can be evaluated (1120). As understood by one of ordinary skill in the art, this involves traversing the syntax tree and executing the set operations and functions in the tree to return the query results.

Otherwise, if OLAP Query module 255 determines that there are set functions and operations in the tree containing explicit references to the calculation, then the explicit references to the calculation are removed from the syntax tree (1110). This is accomplished by simply replacing the references to the calculation with an empty set. For example, function calls such as EnumeratedSet(calculation) may be replaced with an empty set { }, EnumeratedSet(A, B, calculation) may be replaced with EnumeratedSet(A, B), and so on.

As described above with reference to FIG. 5, the modifications performed to the Ancestors and Subset functions present in the syntax tree enable any references to the calculation to be explicitly removed from those functions. For example, the modified Subset function call Subset(m1, m2) when m1 is a calculation is modified to Union(EnumeratedSet(m1), Subset(m1+1, m2)). When the calculation (m1) is removed from the syntax tree, the reference to m1 is replaced from the tree and the Subset(m1, m2) function call becomes Union(EmptySet, Subset(m1+1, m2)).

Evaluating the query after removing the explicit references to the deleted calculation can now be accomplished by simply traversing the tree and executing the set operations and functions in the tree (1120). Doing so guarantees that the query returns results that are independent of the calculation removal from the OLAP hierarchy.

Figure 12A:
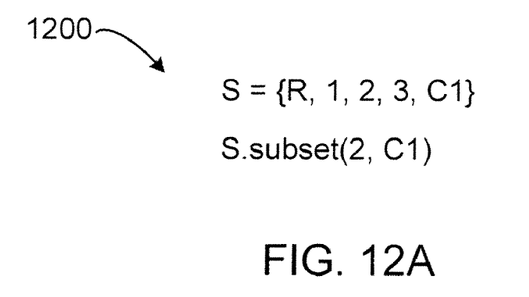
FIG. 12A illustrates an exemplary set in accordance with an embodiment of the invention.
Figure 12B:
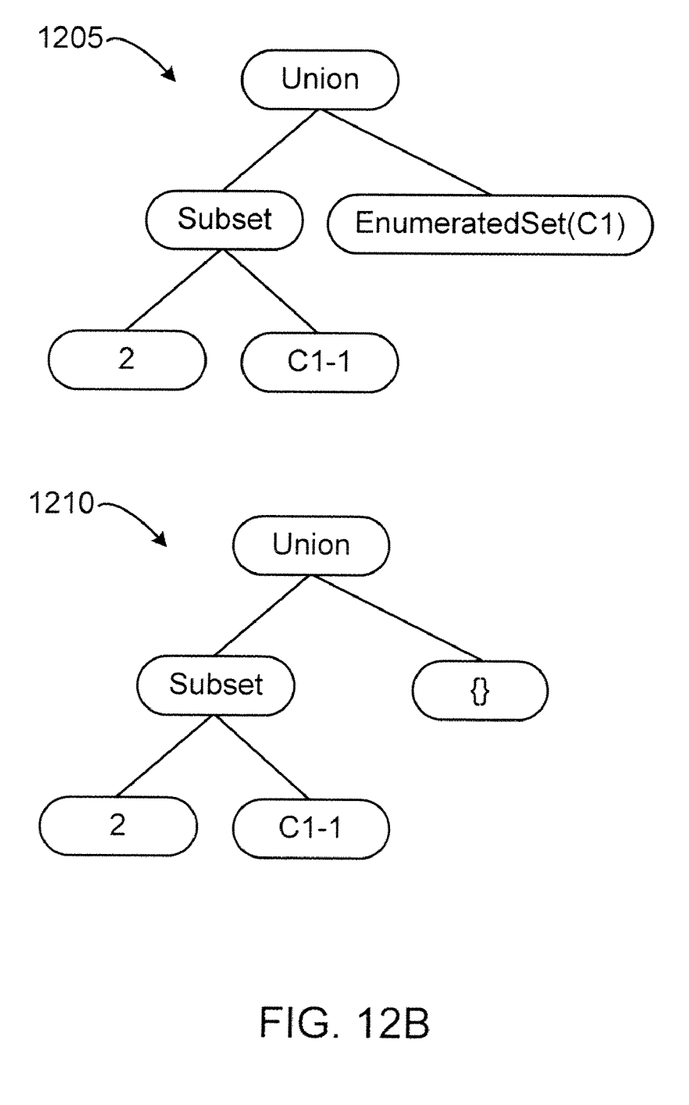
FIG. 12B illustrates a syntax tree for the set of FIG. 12A and a refined syntax tree in response to a calculation removal from the OLAP hierarchy in accordance with an embodiment of the invention.

FIG. 12A illustrates an exemplary set in accordance with an embodiment of the invention. Set 1200 is defined as a set containing the members {R, 1, 2, 3, C1} and then further refined to be a subset starting at member "2" and ending at the calculation "C 1". A syntax tree for this query is shown in FIG. 12B. As described above, the Subset function is modified in the tree to remove the reference to the calculation resulting in syntax tree 1205. Now if the calculation C1 is removed from the OLAP hierarchy, syntax tree 1205 can simply be refined to substitute the explicit references to the calculation, resulting in syntax tree 1210.

Advantageously, the present invention enables users to create and evaluate sets of members of an OLAP hierarchy using dynamic queries that return results that are independent of changes to the OLAP hierarchy metadata. The dynamic queries may be optimized, while retaining the intuitive behavior of static queries.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A computer readable storage medium, comprising executable instructions to:
receive a dynamic query referencing a set of members of an Online Analytic Processing (OLAP) hierarchy, wherein the dynamic query is evaluated at query execution time;
parse the dynamic query into a syntax tree by inserting set functions and set operations into nodes of the syntax tree;
receive changes to the OLAP hierarchy metadata indicative of an added calculation;
refine the syntax tree in response to the changes; and
evaluate the dynamic query to return results that are independent of the changes, such that the dynamic query produces the same results as a static query that is evaluated at set definition time, wherein the executable instructions to evaluate include executable instructions to remove the added calculation.

2. The computer readable storage medium of claim 1, further comprising executable instructions to define the set using set functions joined together with set operations.

3. The computer readable storage medium of claim 2, wherein the set functions are selected from the list comprising: Ancestors, Descendants, EnumeratedSet, Count, Rank, Subset, Sort, and Filter.

4. The computer readable storage medium of claim 2, wherein the set operations are selected from the list comprising: Union, Intersection, and Except.

5. The computer readable storage medium of claim 1, wherein the executable instructions to parse the dynamic query into a syntax tree comprise executable instructions to modify set functions in the syntax tree affected by the changes to the OLAP hierarchy metadata.

6. The computer readable storage medium of claim 5, wherein the set functions in the syntax tree affected by the changes to the OLAP hierarchy metadata comprise the EnumeratedSet and the Ancestors set functions.

7. The computer readable storage medium of claim 1, further comprising executable instructions to receive changes to the set.

8. The computer readable storage medium of claim 1, further comprising executable instructions to add a calculation to the OLAP hierarchy.

9. The computer readable storage medium of claim 8, wherein the executable instructions to refine the syntax tree comprises executable instructions to traverse the syntax tree to find non-commutative set functions referencing the calculation.

10. The computer readable storage medium of claim 9, wherein the non-commutative set functions are selected from the list comprising: Ancestors, Descendants, Count, Rank, and Subset.

11. The computer readable storage medium of claim 10, further comprising executable instructions to apply the Except operation to the non-commutative set functions and to the query to remove references to the calculation.

12. The computer readable storage medium of claim 1, further comprising executable instructions to delete a calculation from the OLAP hierarchy.

13. The computer readable storage medium of claim 12, further comprising executable instructions to remove references to the calculation from the syntax tree.

14. The computer readable storage medium of claim 1, further comprising executable instructions to optimize the dynamic query.

15. A method for evaluating a dynamic query, comprising:
receiving a dynamic query referencing a set of members of an Online Analytic Processing (OLAP) hierarchy;
parsing the dynamic query into a syntax tree by inserting set functions and set operations into nodes of the syntax tree;
modifying the OLAP hierarchy to accommodate calculation changes to the OLAP hierarchy;
refining the syntax tree in response to the changes;
excluding the calculation changes from the dynamic query; and
evaluating the dynamic query to return results that are independent of the calculation changes, such that the dynamic query produces the same results as a static query that is evaluated at set definition time.

16. The method of claim 15, further comprising defining the set using set functions joined together with set operations.

17. The method of claim 15, wherein parsing the dynamic query into a syntax tree comprises modifying set functions in the syntax tree affected by the calculation changes.

18. The method of claim 15, wherein modifying the OLAP hierarchy comprises adding a calculation to the OLAP hierarchy.

19. The method of claim 18, wherein excluding the calculation changes from the dynamic query comprises:
traversing the syntax tree to find non-commutative set functions referencing the calculation;
applying the Except operation to the non-commutative set functions to exclude the calculation from the set functions; and
applying the Except operation to the query to exclude the calculation from the query.

20. The method of claim 15, wherein modifying the OLAP hierarchy comprises deleting a calculation from the OLAP hierarchy.

21. The method of claim 15, further comprising executable instructions to remove references to the calculation from the syntax tree.

22. The method of claim 15, further comprising optimizing the dynamic query.

23. A method comprising:
receiving a dynamic query referencing a set of members of an Online Analytic Processing (OLAP) hierarchy, wherein the dynamic query is evaluated at query execution time;
parsing the dynamic query into a syntax tree by inserting set functions and set operations into nodes of the syntax tree;
receiving changes to the OLAP hierarchy metadata indicative of an added calculation;
refining the syntax tree in response to the changes; and
evaluating the dynamic query to return results that are independent of the changes, such that the dynamic query produces the same results as a static query that is evaluated at set definition time, wherein the added calculation is removed.

* * * * *